US006435306B2

(12) United States Patent
Stoneburg

(10) Patent No.: US 6,435,306 B2
(45) Date of Patent: Aug. 20, 2002

(54) LADDER LEVELING ARRANGEMENT

(76) Inventor: Kenneth J. Stoneburg, 124 Terry Rd., Syracuse, NY (US) 13219

( * ) Notice: Subject to any disclaimer, the term of this patent is extended or adjusted under 35 U.S.C. 154(b) by 0 days.

(21) Appl. No.: 09/824,124

(22) Filed: Apr. 2, 2001

Related U.S. Application Data

(60) Provisional application No. 60/194,079, filed on Apr. 3, 2000.

(51) Int. Cl.[7] ............................ E06C 1/00; E06C 7/00; F16M 11/26

(52) U.S. Cl. ..................... 182/204; 182/200; 248/188.5

(58) Field of Search ................................ 182/200, 201, 182/202, 203, 204, 205, 206, 107, 106, 108, 214; 248/188.2, 188.3, 188.4, 188.5

(56) References Cited

U.S. PATENT DOCUMENTS 5,044,468 A * 9/1991 Worthington, Jr. .......... 182/202
5,094,320 A * 3/1992 Deitz et al. ................. 182/204
5,542,497 A * 8/1996 Macyszyn ................... 182/201
5,551,529 A * 9/1996 Molitor ...................... 182/204
5,718,306 A * 2/1998 Baker ......................... 182/204
5,845,744 A * 12/1998 Beck et al. ................. 182/204
5,908,085 A * 6/1999 Lovelady .................... 182/204

* cited by examiner

*Primary Examiner*—Daniel P. Stodola
*Assistant Examiner*—Hugh B. Thompson
(74) *Attorney, Agent, or Firm*—Bernhard P. Molldrem, Jr.

(57) ABSTRACT

A pair of ladder leveler members attach to the base portion of the side rails of an extension ladder. Each leveler member has a sleeve that is mounted to the respective rail parallel to the rail, and a slide leg that is movable in the sleeve. The ladder swing feet may be mounted to the base of the legs. There are pin holes in the sleeves and in the slide legs that align with one another, and a retaining pin locks the slide leg into position. The ladder leveler allows the ladder to be set plumb, even when the ground is uneven. The sleeves and legs may be C-channel members of rectangular section.

11 Claims, 4 Drawing Sheets

LADDER LEVELING ARRANGEMENT

This application claims priority from Provisional application Ser. No. 60/194,079, filed Apr. 3, 2000.

BACKGROUND OF THE INVENTION

This invention relates to ladders, scaffolds, and similar equipment, and in particular is directed to ladder extenders or levelers which may be attached or affixed to the ladder rails of an extension ladder. The invention is more specifically concerned with devices that permit the base of the ladder to be adjusted to match the terrain so as to permit the ladder to be erected plumb, that is, not leaning to the left or right if the ground support is uneven.

Currently, where ladders are used in outdoor work, i.e., construction, carpentry, maintenance, or painting, the worker depends on the base of the ladder being more-or-less level so that the two rails of the ladder will be supported at the same level. However, it is seldom the case that the ground next to a structure is level, even where the ground is paved. The two rails are typically about sixteen inches apart, while the ladder may extend vertically for twenty-eight feet or more. If there is a difference in grade between the left and right side of the ladder of only one-half inch, this means that at an elevation of sixteen feet, the ladder is leaning six inches to the left or right, and at twenty-eight feet, this lean can be ten inches. With this much lean, the workman is placed in a dangerous position. In order to straighten the ladder, it is usual to place a prop under the base of one or the other ladder rails, i.e., a board or a slab. However, this is also considered an unsafe practice, as the ladder, board, or slab may be prone to slippage. Also, it is difficult to find a board or slab of the correct thickness and which is also strong enough to support the weight of the ladder plus the worker and any equipment.

While a number of braces have been proposed to hold up the upper end of the ladder, there has not been an adequate adjustment device for lengthening one or the other of the ladder rails at the lower end or base in order to accommodate uneven ground.

OBJECTS AND SUMMARY OF THE INVENTION

Accordingly, it is an object of the present invention to provide a ladder leveling arrangement that avoids the drawbacks of the prior art.

It is another object to provide a ladder leveling arrangement that attaches unobtrusively to the base of the ladder and permits the base or feet of the ladder rails to be extended so that the ladder is plumb when it is erected.

It is a more specific object to provide a pair of simple and straightforward extenders of a sleeve and slide-leg configuration that permit the ladder to be used on uneven ground, sloping ground, or even on steps or stairs.

In accordance with one aspect of the present invention, a ladder leveling arrangement is provided for adjusting the base of a ladder so that it may be erected plumb on uneven ground. A left tubular sleeve and a right tubular sleeve attach onto lower ends of the left and right vertical ladder rails, each of the tubular sleeves defining a vertical passage within it. Slidably fitted within the passage of these tubular sleeves are a left slide leg and a right slide leg. There are suitable means provided for attaching the left and right tubular sleeves onto the lower ends of the ladder rails, and means for setting the positions of the slide legs with respect to the associated tubular sleeves.

In one preferred embodiment, the tubular sleeve and the slide leg within it are in the form of C-channel members of generally square or rectangular cross section. The sleeves have openings on the webs for attaching to the ladder. In the case of most aluminum and fiberglass ladders, the rungs are hollow, tubular members with a bore that extends through the ladder rails. In such case, a threaded rod can run through the lowest rung, and through the openings in the sleeve members. Washers and threaded nuts hold the sleeve in place on the rail. Another opening, i.e., bolt hole, exists at the bottom of the rail, where the usual ladder footing is attached. This footing is removed and is installed instead on the lower end of the slide leg. There is an opening in the web of the sleeve near the lower end, and the sleeve is also secured here to the rail by means of a bolt, washer and nut passing through this opening and the bolt hole at the lower end of the ladder rail.

The tubular sleeves each have at least one pin opening through them, and preferably there are three of these near the upper end. A row of pin openings also along at least the upper half of the slide leg. These openings align with one another as the slide leg is adjusted. A retaining pin then passes through the aligned holes or pin openings to lock the slide leg in position in respect to the associated tubular mounting sleeve. Because the two slide legs can be adjusted independently over a length of twelve inches or more, it is possible to adjust these so the ladder may be used on sloping or rocky terrain, or even on stairs or steps where the two ladder rails are on different stair treads.

This construction of a ladder extender or leveler device does not interfere with the operation of the upper or extension portion of the ladder, which typically has to slide along the inner sides of the main portion ladder rails.

In the case of a wooden ladder, it is possible to secure the tubular sleeves to the ladder rails with a set of wood screws. It is also possible to secure these sleeves to an aluminum or other ladder by drilling suitable holes in the ladder rails. In that case, the holes may be threaded for receiving screws. It is also possible to use straps, clamps, or other fastening members to mount the sleeve members onto the lower ends of the ladder rails.

In the preferred embodiment, the sleeve and slide legs are C-channel members of generally rectangular section. However, these may be constructed of members of other shape, such as square tubular members. In that case, countersunk holes may be drilled into the outer sleeve so that fastening members do not interfere with sliding of the slide legs. In other embodiments, the slide legs may be I-beam members, or may be solid.

The term "vertical" as used here means in the longitudinal direction in respect to the ladder rails, i.e., parallel to the ladder rails.

The above and many other objects, features, and advantages of this invention will be more fully appreciated from the ensuing description of a preferred embodiment, which is to be read in conjunction with the accompanying Drawing.

DETAILED DESCRIPTION OF THE PREFERRED EMBODIMENT

Figure 1:
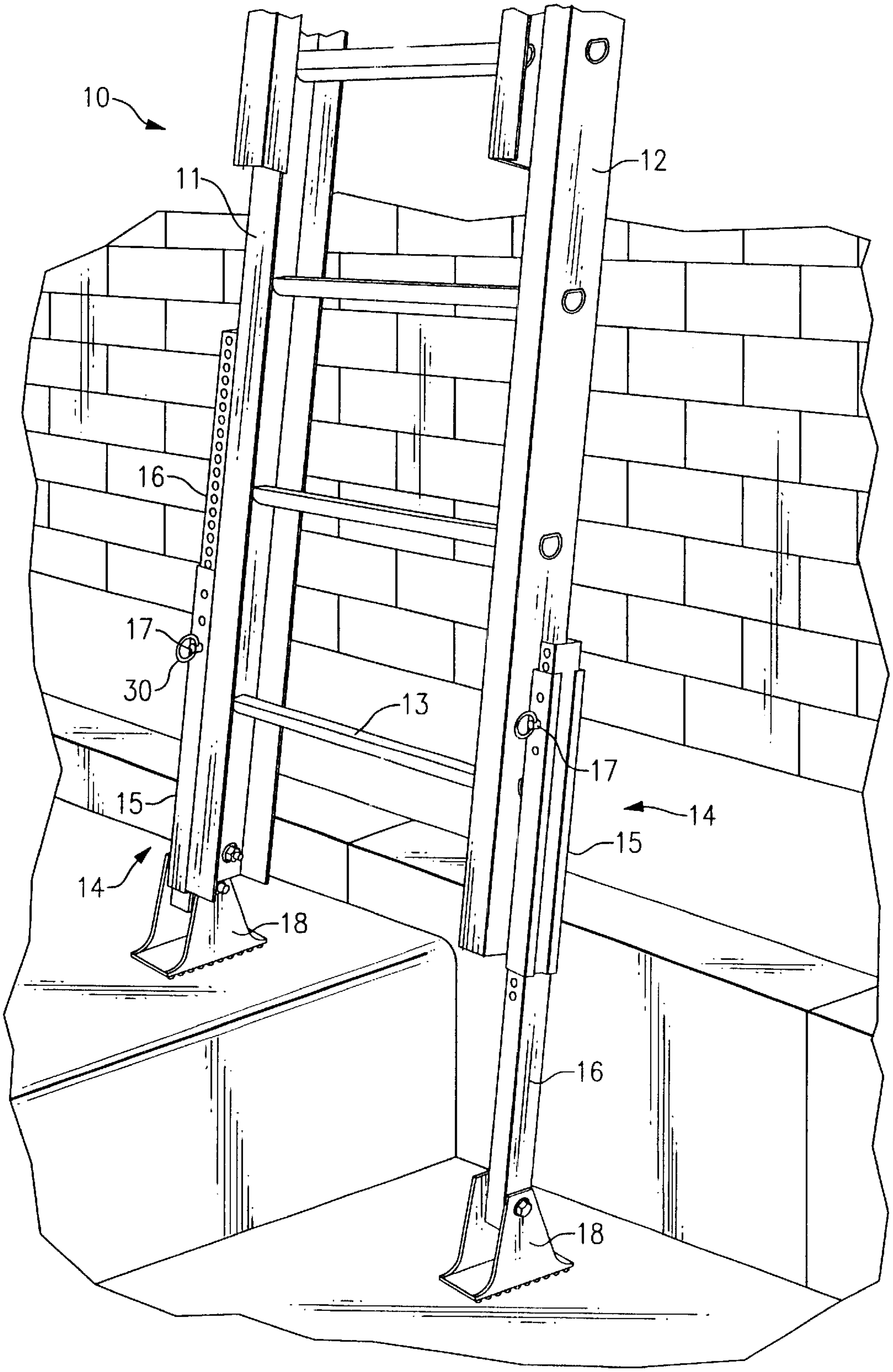
FIG. 1 is a perspective view of an extension ladder with a ladder leveling arrangement according to an embodiment of the present invention, here shown accommodating a ground support, to wit, steps, in which the ground supporting the left and right ladder rails may be at vastly different levels.

With reference now to the Drawing, FIG. 1 shows an extension ladder 10 positioned against a wall. The ladder, as is usual, comprises a left elongated ladder rail 11, a right ladder rail 12, and a number of rungs 13 that extend horizontally between the two rails. Here, a lower end of the ladder rests on uneven terrain, in this case with its left rail 11 and right rail 12 supported on different treads of a set of steps.

Here a set of ladder levelers 14, 14 are attached to the lower ends of the ladder rails along the outer sides of the rails 11, 12, and these ladder levelers adjust the length of the ladder rails to accommodate the supporting terrain, so that the ladder 10 can be erected without leaning either to the right or to the left.

Each of the ladder levelers 14 comprises an outer sleeve 15 which is in the form of a tubular member, here a C-channel of rectangular cross section. In this embodiment, the sleeve 15 is about twelve inches in length with outer dimensions of 2-5⁄16 inches front to back and 1-5⁄16 inches across. The sleeve 15 has a web side 31, a pair of side flanges 32, 32, and inwardly directed lips 33, 33 parallel to the web side, and that define a gap 34 between them. This leaves an interior passageway of slightly over 1 inch by 2 inches. Slidably fitted into the sleeve 15 is a slide leg 16, here a C-channel member of rectangular cross section about two feet in length and having dimensions of about 1 inch by 2 inches. The slide leg 16 also has a web side 35, a pair of side flanges 36, 36, and a pair of inwardly directed lips 37, 37 parallel to the web 35 and that define between them a gap 38. Each sleeve and leg combination is provided with a retaining or hitch pin 17, described more fully later. Swing feet 18 from the ladder are repositioned at the base of the slide legs 16. The slide legs are adjustably positionable within the tubular sleeves so that the feet 18 can be at different vertical positions to accommodate unevenness in the supporting ground, floor, or pavement, on which the ladder is resting.

Figure 2:
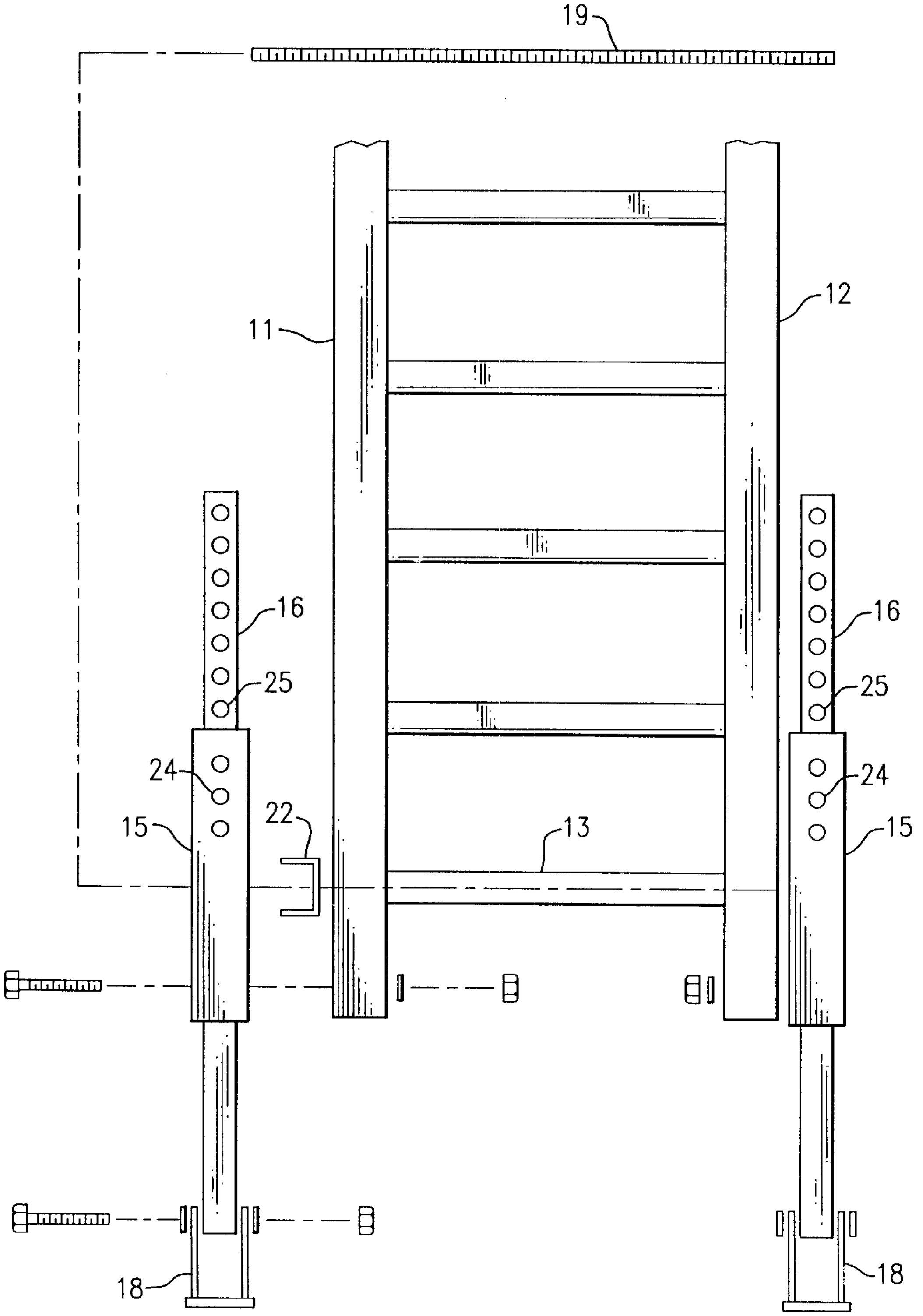
FIG. 2 is an schematic assembly view of the arrangement of this embodiment.
Figure 3:
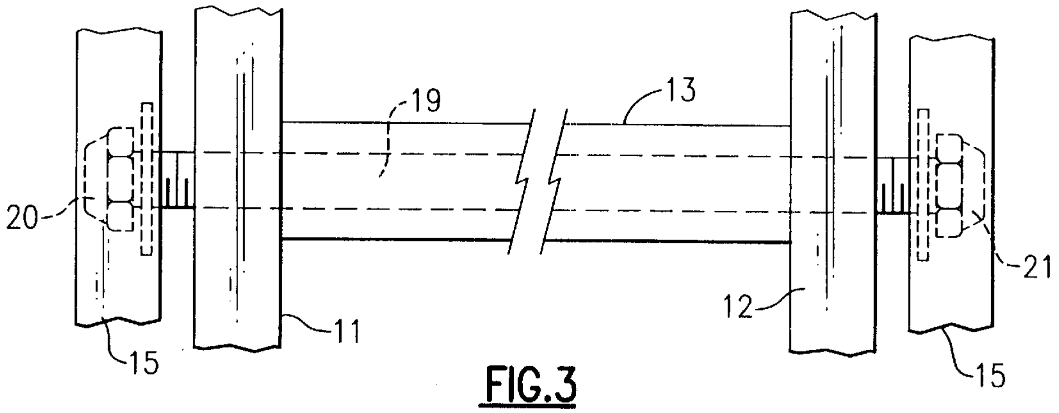
FIG. 3 is an illustrative schematic view of a threaded rod passing through a lower rung for attaching the arrangement of this embodiment to the ladder.
Figure 5:
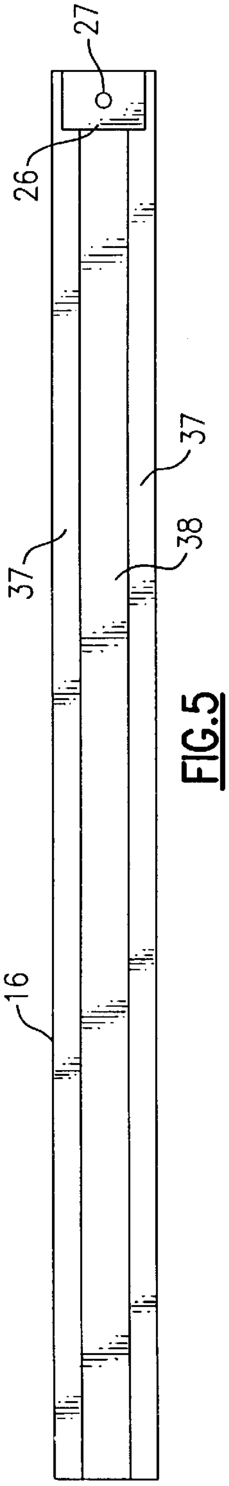
FIG. 5 is an inner side view of a slide leg of this embodiment.

As shown in FIGS. 2 and 3, the ladder levelers 14 can be mounted easily on the rails 11, 12 of the ladder, which here is an aluminum or fiberglass extension ladder. First, the slide legs 16 are removed from the tubular sleeve members 15 and the two swing feet 18 are removed from the bases of the ladder rails. The swing feet are then attached to the base or lower end of the slide legs using bolts and nuts provided, through a reinforcing member 26 in which attachment bolt hole 27 is provided (FIG. 5). The swing feet 18 should be allowed to have some play so that they will function the same as they did on the ladder rails.

Figure 7:
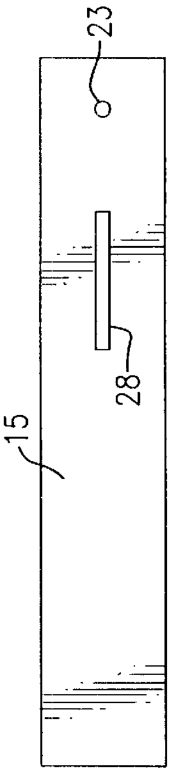
FIG. 7 is a web-side view of the tubular sleeve of this embodiment.

The tubular sleeves 15 are installed with the three adjustment holes 24 positioned at the top and facing front, as shown in FIG. 2. The lower ends of the sleeves 15 are attached by passing bolts through a bolt hole 23 (FIG. 7) and through the lower mounting hole in the respective ladder rail 11, 12 from which the swing foot 18 had been mounted. Spacers 22 are provided, and may be used as necessary between the ladder rail 11, 12 and the web side of the associated sleeve 15. A threaded rod 19 is provided, which is passed through the bore or hollow interior of the lowermost ladder rung 13. A slot or (other shape hole) 28 is provided in the web of the tubular sleeve 15, to receive a respective end of the threaded rod 19. Spacers 22 may be used, if needed, between the ladder rail and the web of the sleeve 15. A cap nut 20 and washer are used on one end of the rod 19, and a lock nut 21 and washer are installed on the other end. In some cases, it may be necessary to trim a portion of the end of the rod 19 so that only about ⅛ inch of the rod protrudes from the lock nut 21.

In some cases, it may be necessary to drill a hole through the web of the sleeve to receive the threaded rod 19, and this may be done using a standard ⅜ inch drill bit.

After the nuts and bolts have been suitably tightened, the slide legs 16 are inserted into the sleeves 15. The legs 16 can be locked in place to the sleeves 15 using the hitch pins 17.

Figure 4:
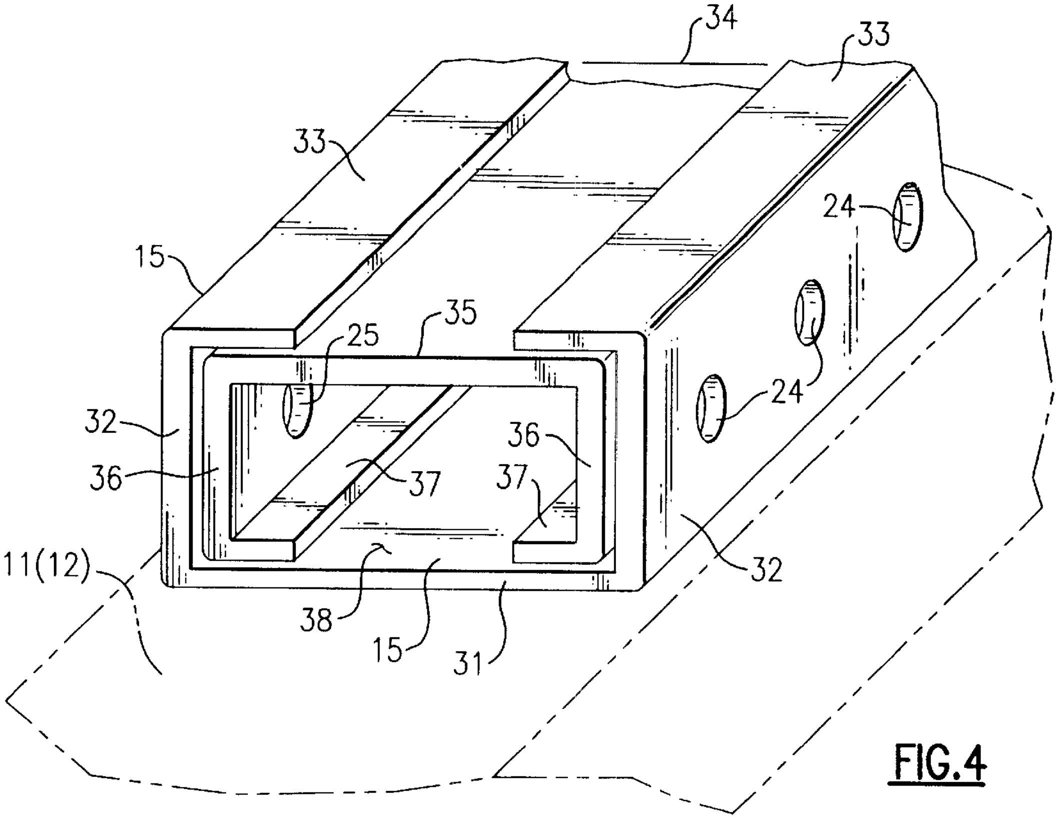
FIG. 4 is a perspective end view of one side of the ladder leveling arrangement of this embodiment.
Figure 6:
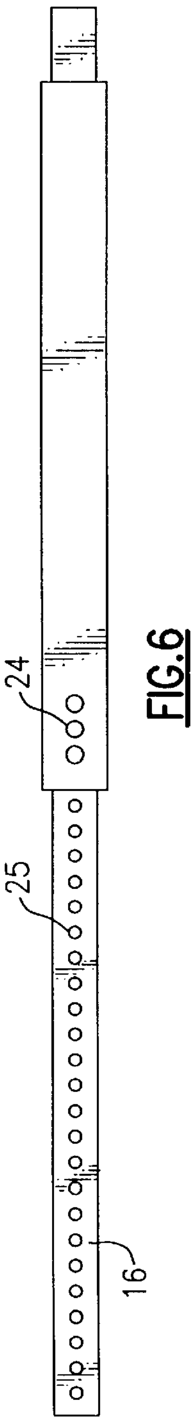
FIG. 6 is a front edge view of the slide leg and tubular sleeve of this embodiment.
Figure 8:
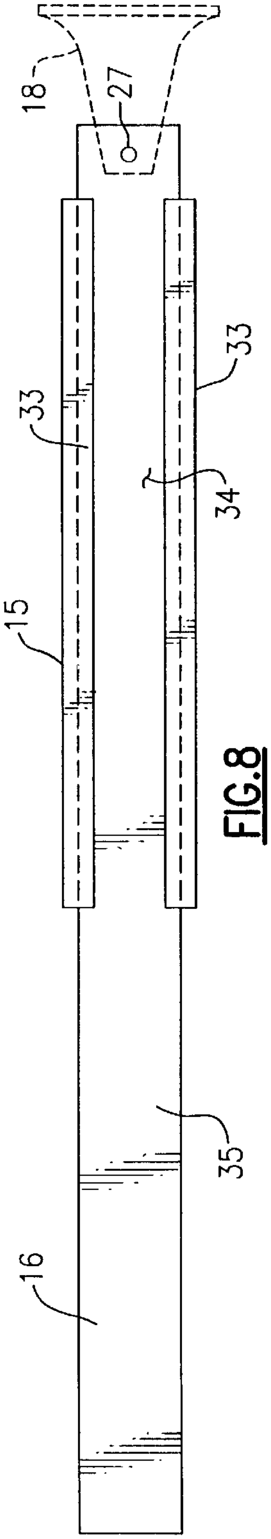
FIG. 8 is an outer side view of the tubular sleeve and slide leg of this embodiment.

FIG. 4 shows the cross sections of the tubular mounting sleeve 15 and the associated slide ladder rail 11 or 12 with the web side 31 facing the rail and with the gap 34 between the lips 37 of the side flanges 35 facing outward. At the same time, the slide leg 16 is oriented with the web side 35 facing outward, and the gap 38 facing toward the ladder rail (see FIG. 8). The elongated gap 38 in the C-channel slide leg 16 allows it to move unobstructed by the mounting hardware (e.g. 20, 21) that holds the sleeve to the ladder rail. As shown here and in FIG. 6, there are retaining pin holes 24 at the upper end of the sleeve 15 and associated retaining pin holes 25 that extend front to back through the flanges of the slide leg 16. In this embodiment, there are three sets of pin holes 24 at the upper end of the tubular mounting sleeve 15, and a series of retaining pin holes 25 along approximately the upper half of the slide leg 16. The holes 24 are positioned at about ½ inch intervals, and the holes 25 are positioned at about ⅜ inch intervals. When the slide legs are adjusted up or down in the sleeves, the holes 24 and 25 will align with one another. The spacing used here permits the legs to be adjusted at a precision of ⅛ inch.

The ladder is now ready for use. The worker holds the ladder in an upright position and leaned against the wall or other structure, but positioned as close as plumb or vertical as possible. This may result in one side or the other being off the ground. That side of the ladder can be adjusted by extending the leg 16 downward to the ground. This is done by removing the hitch pin or retaining pin 17 from that side, and then allowing the slide leg 16 to slide in the sleeve 15 until the foot 18 reaches the ground. Then the pin 17 is replaced into one of the three holes 24 that most closely aligns with a corresponding hole 25 in the slide leg 16. Then the ladder is checked to make sure that it is stable and secure, as it is not difficult to re-adjust, if necessary. Then the worker should make sure that pin 17 is pushed all the way through the mounting sleeve 15 and that it locks in place. A ring 30 may be used to secure the pin and prevent it from falling out.

The usual precautions should still be taken, including tying the ladder from both sides to a support, and avoiding use of the ladder in high winds. However, the placement of the ladder levelers 14, 14 to the outer side of the ladder rails 11, 12 gives the ladder a somewhat wider base, and does provide additional stability.

Other embodiments of this invention are also possible. For example, the ladder leveler may have a round cross section in some cases. Also, the slide legs may be formed of I-beam members, for example. In the case of a wooden ladder, the sleeves 15 may be secured by wood screws directly to the ladder rails. Other attachment means may be used also where the rungs 13 do not have continuous open interiors, or where they do not pass through the rails. In some possible embodiments, the sleeve members may be attached by straps or clamps onto the ladder rails. Also, instead of the pins 17, other securing devices, e.g., a screw arrangement, may be used to adjust the legs 16 or to lock the legs 16 securely in place on the sleeves 15. Ladder levelers of this general type may be used with other types of ladders besides extension ladders, or may be employed with various other scaffolding type equipment.

While the invention has been described with reference to a specific preferred embodiment, the invention is certainly not limited to that precise embodiment. Rather, many modifications and variations will become apparent to persons of skill in the art without departure from the scope and spirit of this invention, as defined in the appended claims.

I claim:

1. A ladder leveling arrangement adapted for adjusting the base of a ladder so that it may be erected plumb on uneven ground; wherein the ladder comprises left and right vertical rails and a plurality of rungs therebetween, the arrangement comprising: a left tubular sleeve and a right tubular sleeve of rectangular cross section that are adapted to attach onto lower ends of said left and right vertical rails, each said tubular sleeve defining a vertical passage; a left slide leg and a right slide leg each disposed slidably in the passage of a respective one of said tubular sleeves; means adapted for mounting the left and right tubular sleeves onto the lower ends of said left and right vertical rails; and means removably inserted into said tubular sleeves for setting the positions of each of the slide legs with respect to the associated tubular sleeve; wherein said left and right slide legs each include means for avoiding contact with the means for mounting the left and right tubular sleeves so as to permit free movement of the slide legs in a direction parallel to said vertical rails when said means for setting are removed from said tubular sleeves within said slide are C-channel members of generally rectangular cross section each having a web, side flanges and lips on said side flanges, said lips defining a slot therebetween, the slot constituting said means for avoiding contact by providing clearance over said means adapted for mounting the left and right tubular sleeves onto the lower ends of said left and right vertical rails.

2. The ladder leveling arrangement of claim 1 wherein said tubular sleeves are C-channel members having a web, side flanges and lips on said side flange that define a slot therebetween, said slot providing access for attaching said means adapted for mounting onto the associated vertical rail.

3. The ladder leveling arrangement of claim 1 wherein at least one of said ladder rungs is hollow with a bore extending through said left and right ladder rails; and said means adapted for mounting includes a threaded rod member passing through the bore of said rung and through openings in said tubular sleeves, and cooperating threaded fastener members that fit onto ends of said threaded rod member, wherein said threaded fastener members are positioned within the slots of said slide legs.

4. The ladder leveling arrangement of claim 1 wherein said tubular sleeves are adapted to attach to outer sides of said vertical rail members.

5. The ladder leveling arrangement of claim 1 wherein said tubular sleeves each have at least one pin opening; and the slide legs each have a row of pin openings therethrough that align with the at least one opening in the tubular sleeve; and said means for setting the positions of the slide legs include retaining pins that are positioned into aligned pin openings in the slide legs and the tubular sleeves.

6. The ladder leveling arrangement of claim 1 wherein said slide legs each have an opening therethrough at a lower end thereof adapted for attachment of a ladder foot.

7. The ladder leveling arrangement of claim 1 wherein each new sleeve has a row of pin holes therealong, said pin holes having a first predetermined hole interval therebetween; each said slide leg has a row of pin holes therethrough, said pin holes having a second predetermined hole interval therebetween; and a pair of pins removably inserted into said holes of said tubular sleeve and aligned holes of said slide legs for setting the positions of each of the slide legs with respect to the associated tubular sleeve; wherein said first and second hole spacings are selected so that the positions of said slide legs can be set at a precision that is smaller than either said first interval or said second interval.

8. The ladder leveling arrangement of claim 7 wherein said slide legs each have an opening therethrough at a lower end thereof adapted for attachment of a ladder foot.

9. The ladder leveling arrangement of claim 7 wherein the first and second intervals are selected such that at a given setting, only one of the holes of the sleeve will be aligned with a hole of the row of holes in the associated leg.

10. The ladder leveling arrangement of claim 7 wherein there are said rows of pin holes on said sleeves each consists of three holes, and the first and second intervals are selected such that at a given setting, only one of the three holes of the sleeve will be aligned with a hole of the row of holes in the associated leg.

11. The ladder leveling arrangement of claim 7 wherein said rows of pin holes on said sleeves are situated at upper ends of said sleeves.

* * * * *